US010133996B2

(12) United States Patent
McCann et al.

(10) Patent No.: US 10,133,996 B2
(45) Date of Patent: *Nov. 20, 2018

(54) OBJECT LIFECYCLE ANALYSIS TOOL

(71) Applicant: International Business Machines Corporation, Armonk, NY (US)

(72) Inventors: Tony McCann, Matthews, NC (US); John W. Medlin, Jr., Matthews, NC (US); William W. Plyler, Matthews, NC (US); Ricky C. Skinner, Concord, NC (US)

(73) Assignee: International Business Machines Corporation, Armonk, NY (US)

( * ) Notice: Subject to any disclaimer, the term of this patent is extended or adjusted under 35 U.S.C. 154(b) by 294 days.

This patent is subject to a terminal disclaimer.

(21) Appl. No.: 14/259,023

(22) Filed: Apr. 22, 2014

(65) Prior Publication Data
US 2015/0302327 A1   Oct. 22, 2015

(51) Int. Cl.
*G06Q 10/06* (2012.01)

(52) U.S. Cl.
CPC ..... *G06Q 10/0633* (2013.01); *G06Q 10/0639* (2013.01)

(58) Field of Classification Search
None
See application file for complete search history.

(56) References Cited

U.S. PATENT DOCUMENTS

| 5,233,513 | A | * | 8/1993 | Doyle | G06F 8/30 |
| | | | | | 705/1.1 |
| 5,258,855 | A | * | 11/1993 | Lech | G06K 9/2054 |
| | | | | | 358/448 |
| 5,309,919 | A | * | 5/1994 | Snell | A61N 1/37247 |
| | | | | | 600/510 |

(Continued)

FOREIGN PATENT DOCUMENTS

| WO | 2002073465 A2 | 9/2002 |
| WO | 2012105927 A1 | 8/2012 |

OTHER PUBLICATIONS

Alves, Claudia Sofia de Costa, Social Network Analysis for Business Process Discovery, Universidade Tecnica de Lisboa, Jul. 2010 https://dspace.ist.utl.pt/bitstream/2295/751982/1/Claudia-Alves-55815-DissertacaoFinal.pdf.*

(Continued)

*Primary Examiner* — Octavian Rotaru
(74) *Attorney, Agent, or Firm* — Patterson + Sheridan, LLP

(57) ABSTRACT

Embodiments presented herein provide techniques for generating analytical graphs that display a visualization of multiple transaction objects processed concurrently in a computer system. An object lifecycle analysis tool identifies one or more transaction objects having a specified identifier. Each transaction object corresponds to an instance of a common transaction having been processed. The analysis tool retrieves transition state information corresponding to each transaction object and sorts the transition state infor- (Continued)

mation in chronological order. The analysis tool generates a graph based on the sorted transition state information. The generated graph allows a user to easily identify performance issues (e.g., concurrency bottlenecks) in a transaction management system.

6 Claims, 6 Drawing Sheets

(56) References Cited

U.S. PATENT DOCUMENTS

| | | | | |
|---|---|---|---|---|
| 5,369,508 A * | 11/1994 | Lech | G06K 9/2054 358/448 |
| 5,431,691 A * | 7/1995 | Snell | A61N 1/37247 607/27 |
| 5,487,754 A * | 1/1996 | Snell | A61N 1/37247 607/27 |
| 5,487,755 A * | 1/1996 | Snell | A61N 1/37247 607/27 |
| 5,625,465 A * | 4/1997 | Lech | G06K 9/2054 358/403 |
| 5,629,884 A * | 5/1997 | Pan | G06F 1/035 341/75 |
| 5,693,473 A * | 12/1997 | Shattuck-Eidens | C07K 14/82 435/6.12 |
| 5,709,999 A * | 1/1998 | Shattuck-Eidens | C07K 14/82 435/6.12 |
| 5,710,001 A * | 1/1998 | Skolnick | C07K 14/82 435/6.12 |
| 5,747,282 A * | 5/1998 | Skolnick | C07K 14/4702 435/320.1 |
| 5,753,441 A * | 5/1998 | Skolnick | C07K 14/82 424/1.11 |
| 5,768,416 A * | 6/1998 | Lech | G06K 9/2054 382/175 |
| 5,837,492 A * | 11/1998 | Tavtigian | C07K 14/4703 435/320.1 |
| 5,890,127 A * | 3/1999 | Buzsaki | G06Q 10/087 705/28 |
| 5,890,174 A * | 3/1999 | Khanna | G06F 17/246 715/209 |
| 5,918,232 A * | 6/1999 | Pouschine | G06F 17/30592 |
| 5,926,792 A * | 7/1999 | Koppes | G06Q 40/00 705/35 |
| 5,940,804 A * | 8/1999 | Turley | G06Q 10/06311 705/7.13 |
| 5,970,479 A * | 10/1999 | Shepherd | G06Q 40/02 705/37 |
| 5,987,247 A * | 11/1999 | Lau | G06F 8/24 717/100 |
| 5,999,910 A * | 12/1999 | Rosenfeld | G06Q 10/0633 705/32 |
| 6,006,193 A * | 12/1999 | Gibson | G06Q 10/06316 705/7.26 |
| 6,023,702 A * | 2/2000 | Leisten | G06Q 10/06 |
| 6,029,154 A * | 2/2000 | Pettitt | G06Q 20/027 705/38 |
| 6,033,857 A * | 3/2000 | Tavtigian | C07K 14/4703 435/320.1 |
| 6,058,368 A * | 5/2000 | Aourane | G06Q 10/06375 702/34 |
| 6,081,786 A * | 6/2000 | Barry | G06F 19/3443 705/2 |
| 6,128,415 A * | 10/2000 | Hultgren | G06T 1/00 345/600 |
| 6,188,988 B1 * | 2/2001 | Barry | G06F 19/3443 705/2 |
| 6,192,347 B1 * | 2/2001 | Graff | G06Q 30/06 705/31 |
| 6,212,530 B1 * | 4/2001 | Kadlec | G06F 17/30014 |
| 6,256,598 B1 * | 7/2001 | Park | G05B 19/056 700/100 |
| 6,258,540 B1 * | 7/2001 | Lo | C12Q 1/6879 435/440 |
| 6,275,977 B1 * | 8/2001 | Nagai | G06F 8/30 717/104 |
| 6,292,788 B1 * | 9/2001 | Roberts | G06Q 30/04 705/35 |
| 6,292,830 B1 * | 9/2001 | Taylor | G06N 5/043 709/224 |
| 6,339,838 B1 * | 1/2002 | Weinman, Jr. | G06Q 10/10 717/104 |
| 6,349,320 B1 * | 2/2002 | Emberton | G06Q 10/10 718/100 |
| 6,355,623 B2 * | 3/2002 | Seidman | A61K 31/52 514/263.4 |
| 6,398,646 B1 * | 6/2002 | Wei | G07F 17/32 463/16 |
| 6,507,856 B1 * | 1/2003 | Chen | G06Q 30/04 707/999.001 |
| 6,553,350 B2 * | 4/2003 | Carter | G06Q 20/201 705/20 |
| 6,573,103 B1 * | 6/2003 | Wald | G01N 33/689 435/4 |
| 6,585,516 B1 * | 7/2003 | Alabaster | G09B 19/0092 128/921 |
| 6,618,047 B1 * | 9/2003 | Lim | 345/421 |
| 6,625,582 B2 * | 9/2003 | Richman | G06Q 20/10 705/35 |
| 6,656,045 B2 * | 12/2003 | Wei | G07F 17/32 463/16 |
| 6,680,302 B2 * | 1/2004 | Seidman | A61K 31/52 514/263.1 |
| 6,694,362 B1 * | 2/2004 | Secor | G06Q 10/087 705/28 |
| 6,792,432 B1 * | 9/2004 | Kodavalla | G06F 17/30348 |
| 6,832,229 B2 * | 12/2004 | Reed | G06F 17/30368 |
| 6,912,510 B1 * | 6/2005 | Shepherd | G06Q 40/04 705/37 |
| 6,934,934 B1 * | 8/2005 | Osborne, II | G06F 11/3414 709/224 |
| 6,954,758 B1 * | 10/2005 | O'Flaherty | G06Q 30/02 707/802 |
| 7,013,284 B2 * | 3/2006 | Guyan | G06Q 10/06311 705/4 |
| 7,058,588 B2 * | 6/2006 | Young | G06Q 10/04 705/7.26 |
| 7,076,445 B1 * | 7/2006 | Cartwright | G06Q 30/02 705/1.1 |
| 7,127,421 B1 * | 10/2006 | Beacham | G06Q 10/00 703/22 |
| 7,149,720 B2 * | 12/2006 | Shepherd | G06Q 10/06 705/37 |
| 7,168,077 B2 * | 1/2007 | Kim | G06Q 10/10 705/7.27 |
| 7,181,427 B1 * | 2/2007 | DeFrancesco | G06Q 20/10 705/35 |
| 7,222,302 B2 * | 5/2007 | Hauser | G06Q 10/06 709/223 |
| 7,249,037 B2 * | 7/2007 | Koppes | G06Q 40/00 705/36 R |
| 7,333,912 B2 * | 2/2008 | Iida | G01B 11/14 700/177 |
| 7,346,545 B2 * | 3/2008 | Jones | G06Q 30/02 705/14.73 |
| 7,386,797 B1 * | 6/2008 | Chatterjee | G06Q 10/06 705/301 |
| 7,428,519 B2 * | 9/2008 | Minsky | G06Q 10/06 706/47 |
| 7,503,032 B2 * | 3/2009 | Bhaskaran | G06Q 10/06 705/348 |
| 7,506,302 B2 * | 3/2009 | Bahrami | G06Q 10/067 717/100 |
| 7,603,382 B2 * | 10/2009 | Halt, Jr. | |
| 7,644,019 B2 * | 1/2010 | Woda | G06Q 10/10 705/35 |
| 7,681,029 B1 * | 3/2010 | Birkner | G06K 13/07 713/100 |

(56) References Cited

U.S. PATENT DOCUMENTS

| | | | | |
|---|---|---|---|---|
| 7,685,053 B2* | 3/2010 | Graff | G06Q 30/06 | 705/37 |
| 7,694,272 B2* | 4/2010 | Bronicki | G06F 8/34 | 717/104 |
| 7,707,505 B1* | 4/2010 | Ohrt | G06F 17/30893 | 715/738 |
| 7,725,375 B2* | 5/2010 | Shepherd | G06Q 10/06 | 705/35 |
| 7,788,201 B2* | 8/2010 | Gschwind | G06N 5/02 | 706/47 |
| 7,885,840 B2* | 2/2011 | Sadiq | G06Q 10/06311 | |
| 7,908,202 B2* | 3/2011 | Graff | G06Q 30/06 | 705/35 |
| 7,970,713 B1* | 6/2011 | Gorelik | G06Q 30/0211 | 705/1.1 |
| 8,018,471 B2* | 9/2011 | Panditharadhya | G06W 10/06 | 345/418 |
| 8,019,060 B2* | 9/2011 | Martino | G06F 17/243 | 379/88.17 |
| 8,073,731 B1* | 12/2011 | Rajasenan | G06Q 10/0637 | 705/7.38 |
| 8,083,137 B2* | 12/2011 | Tannenbaum | 235/380 | |
| 8,209,633 B1* | 6/2012 | Eismann | G06F 8/34 | 345/473 |
| 8,230,329 B2* | 7/2012 | Rohan | G06Q 10/063 | 703/6 |
| 8,296,412 B2* | 10/2012 | Secor | G06Q 10/087 | 709/223 |
| 2001/0052113 A1* | 12/2001 | Hearne | G06F 8/24 | 717/106 |
| 2002/0026347 A1* | 2/2002 | Yanagino | G06Q 10/06 | 705/7.31 |
| 2002/0065701 A1* | 5/2002 | Kim | G06Q 10/06311 | 705/7.13 |
| 2002/0069167 A1* | 6/2002 | Conlow | G06Q 20/102 | 705/40 |
| 2002/0091617 A1* | 7/2002 | Keith | G06Q 40/00 | 705/37 |
| 2002/0095369 A1* | 7/2002 | Kaplan | G06Q 30/08 | 705/37 |
| 2002/0095520 A1* | 7/2002 | Wettstein | H04L 29/12009 | 709/253 |
| 2002/0128996 A1* | 9/2002 | Reed | G06F 17/30368 | |
| 2002/0143497 A1* | 10/2002 | Roser | G05B 15/02 | 702/182 |
| 2002/0194393 A1* | 12/2002 | Hrischuk | G06F 9/542 | 719/318 |
| 2003/0023656 A1* | 1/2003 | Hutchison | G06F 9/524 | 718/100 |
| 2003/0028682 A1* | 2/2003 | Sutherland | G06F 9/4435 | 719/315 |
| 2003/0033191 A1* | 2/2003 | Davies | G06Q 10/06 | 705/7.14 |
| 2003/0088442 A1* | 5/2003 | Michael | G06F 19/327 | 705/3 |
| 2003/0097328 A1* | 5/2003 | Lundberg | G06Q 40/04 | 705/37 |
| 2003/0233308 A1* | 12/2003 | Lundberg | G06Q 40/04 | 705/37 |
| 2004/0034584 A1* | 2/2004 | Cory, Sr. | G06Q 40/00 | 705/35 |
| 2004/0078782 A1* | 4/2004 | Clement | G06F 9/5033 | 717/116 |
| 2004/0254945 A1* | 12/2004 | Schmidt | G06F 8/34 | 709/203 |
| 2005/0015329 A1* | 1/2005 | Tyson-Quah | G06Q 20/10 | 705/38 |
| 2005/0028157 A1* | 2/2005 | Betancourt | G06F 9/524 | 718/100 |
| 2005/0108294 A1* | 5/2005 | Koerner | G06F 17/30592 | |
| 2005/0149908 A1* | 7/2005 | Klianev | G06F 9/5038 | 717/109 |
| 2005/0171833 A1* | 8/2005 | Jost | G06Q 10/00 | 705/7.38 |
| 2005/0220213 A1* | 10/2005 | Tate | A61K 8/8152 | 375/295 |
| 2005/0234575 A1* | 10/2005 | Wu | G05B 19/41865 | 700/97 |
| 2006/0064667 A1* | 3/2006 | Freitas | G06F 8/35 | 717/104 |
| 2006/0072721 A1* | 4/2006 | Wisniewski | G06F 17/30905 | 379/88.22 |
| 2006/0116922 A1* | 6/2006 | Homann | G06Q 10/06 | 705/348 |
| 2006/0143057 A1* | 6/2006 | Sadiq | G06Q 10/06 | 705/7.15 |
| 2006/0161879 A1* | 7/2006 | Lubrecht | G06Q 10/06 | 717/101 |
| 2006/0173724 A1* | 8/2006 | Trefler | G06Q 10/063112 | 705/7.14 |
| 2006/0224434 A1* | 10/2006 | Rumi | G06Q 10/06 | 705/7.27 |
| 2006/0224702 A1* | 10/2006 | Schmidt | G06Q 10/10 | 709/219 |
| 2006/0282458 A1* | 12/2006 | Tsyganskiy | G06F 8/72 | |
| 2007/0005618 A1* | 1/2007 | Ivanov | G06Q 30/00 | |
| 2007/0006139 A1* | 1/2007 | Rubin | G06F 8/30 | 717/106 |
| 2007/0022383 A1* | 1/2007 | Barker | G06Q 99/00 | 715/733 |
| 2007/0043733 A1* | 2/2007 | Cannon | G06F 17/30312 | |
| 2007/0055558 A1* | 3/2007 | Shanahan | G06Q 10/06 | 705/7.26 |
| 2007/0055771 A1* | 3/2007 | Tantawi | G06F 9/505 | 709/224 |
| 2007/0078837 A1* | 4/2007 | Indeck | G06F 17/30477 | |
| 2007/0079247 A1* | 4/2007 | Carignan | G06F 3/0481 | 715/745 |
| 2007/0100683 A1* | 5/2007 | Gartner | G06Q 10/04 | 705/7.31 |
| 2007/0118551 A1* | 5/2007 | Akkiraju | G06Q 10/06 | |
| 2007/0124230 A1* | 5/2007 | Sofianos | G06Q 40/00 | 705/37 |
| 2007/0130180 A1* | 6/2007 | Rasmussen | G06Q 10/10 | |
| 2007/0174185 A1* | 7/2007 | McGoveran | G06F 11/1474 | 705/39 |
| 2007/0220513 A1* | 9/2007 | Hwang | G06F 9/524 | 718/1 |
| 2007/0226027 A1* | 9/2007 | Chang | G06Q 10/06314 | 705/7.24 |
| 2007/0233532 A1* | 10/2007 | Koiso | G06Q 10/00 | 705/7.27 |
| 2007/0244910 A1* | 10/2007 | Mital | G06Q 10/10 | |
| 2007/0245297 A1* | 10/2007 | Kuester | G06F 8/10 | 717/104 |
| 2008/0030766 A1* | 2/2008 | Snyderman | G06Q 10/06 | 358/1.15 |
| 2008/0120129 A1* | 5/2008 | Seubert | G06Q 10/06 | 705/35 |
| 2008/0154749 A1* | 6/2008 | D'hooghe | G06Q 10/087 | 705/28 |
| 2008/0154830 A1* | 6/2008 | Gschwind | G06N 5/02 | 706/47 |
| 2008/0162177 A1* | 7/2008 | Raffel | G06Q 10/063 | 705/7.26 |
| 2009/0019271 A1* | 1/2009 | Kawakami | G06Q 10/06 | 712/227 |
| 2009/0070719 A1* | 3/2009 | Bergamaschi | G06F 17/5031 | 716/113 |
| 2009/0094441 A1* | 4/2009 | Hack | G06F 9/30094 | 712/222 |
| 2009/0112667 A1* | 4/2009 | Blackwell | G06Q 10/00 | 705/7.27 |
| 2009/0138273 A1* | 5/2009 | Leung | G06F 8/34 | 705/348 |
| 2009/0150860 A1* | 6/2009 | Gschwind | G06Q 10/06 | 717/104 |
| 2009/0172042 A1* | 7/2009 | Bracha | G06F 17/50 | |

(56) References Cited

U.S. PATENT DOCUMENTS

| | | | | |
|---|---|---|---|---|
| 2009/0216569 A1* | 8/2009 | Bonev | ............... | G06F 17/30029 |
| | | | | 705/5 |
| 2009/0248650 A1* | 10/2009 | Xian | ................. | G06F 17/30445 |
| 2009/0276274 A1* | 11/2009 | Sasagawa | .......... | G06Q 10/0633 |
| | | | | 705/7.27 |
| 2009/0287537 A1* | 11/2009 | Villoso | .............. | G06Q 10/0639 |
| | | | | 705/7.38 |
| 2009/0292662 A1* | 11/2009 | Ueno | ...................... | G06Q 10/04 |
| | | | | 706/46 |
| 2009/0313058 A1* | 12/2009 | Dumoulin | ........ | G06Q 10/06313 |
| | | | | 705/7.23 |
| 2010/0030732 A1* | 2/2010 | Gschwind | .............. | G06Q 10/06 |
| 2010/0042745 A1* | 2/2010 | Maeda | ................... | G06Q 10/06 |
| | | | | 709/242 |
| 2010/0057666 A1* | 3/2010 | Ziegler | .................. | G06Q 10/06 |
| | | | | 706/59 |
| 2010/0131421 A1* | 5/2010 | Kuester | .................. | G06Q 10/06 |
| | | | | 705/348 |
| 2010/0161572 A1* | 6/2010 | Daum | ...................... | G06F 9/526 |
| | | | | 707/704 |
| 2010/0198875 A1* | 8/2010 | Rieger | ..................... | G06F 17/50 |
| | | | | 707/793 |
| 2010/0305994 A1* | 12/2010 | Gaskell | .................. | G06Q 10/06 |
| | | | | 705/7.23 |
| 2012/0150712 A1* | 6/2012 | Sofianos | ................ | G06Q 40/00 |
| | | | | 705/37 |
| 2012/0197944 A1* | 8/2012 | Foti | ..................... | G06F 12/0253 |
| | | | | 707/98 |
| 2012/0303545 A1* | 11/2012 | Brondstetter | .......... | G06Q 30/00 |
| | | | | 705/347 |
| 2013/0030982 A1* | 1/2013 | Sofianos | ................ | G06Q 40/00 |
| | | | | 705/37 |
| 2013/0085809 A1* | 4/2013 | Muir | ...................... | G06Q 30/02 |
| | | | | 705/7.34 |
| 2013/0212039 A1* | 8/2013 | Burckart | ................ | G06Q 30/02 |
| | | | | 705/347 |
| 2013/0311349 A1* | 11/2013 | Sofianos | ................ | G06Q 40/00 |
| | | | | 705/37 |

OTHER PUBLICATIONS

Boulet et al, Distributed Process Networks Using Half FIFO Queues in CORBA, ISSN 0249-6399, Feb. 21, 2003 http://citeseerx.ist.psu.edu/viewdoc/download?doi=10.1.1.229.456&rep=rep1&type=pdf.*

Bozkaya et al, Process Diagnostics—a method based on process mining, IEEE 978-0-7695-3531-909, 2009 http://ieeexplore.ieee.org/stamp/stamp.jsp?tp=&arnumber=4782560.*

Yang et al, Separation of Concerns—Overhead in Modeling and Efficient Simulation Techniques, ACM 1-58113-860-1-04-0009, Jan. 2004 https://www.researchgate.net/profile/Alberto_Sangiovanni-Vincentelli/publication/220801000_Separation_of_concerns_overhead_in_modeling_and_efficient_simulation_techniques/links/0deec51813ec392e3a000000.pdf.*

Chen et al, A New Approach towards Effective Abstraction of C-based SLDLs, IESS, IFIP AICT 310, pp. 57-65, 2009 http://link.springer.com/chapter/10.1007%2F978-3-642-04284-3_6?LI=true.*

Deng et al, Testing database transaction concurrency, IEEE, ISBN 0769520359, Oct. 10, 2003 http://ieeexplore.ieee.org/xpls/abs_all.jsp?arnumber=1240306.*

Jans et al, Business Process Mining for Internal Fraud Risk Reduction, 15th World Continous Auditing and Reporting Symposium, Heraklion, Jul. 7-8, 2008 https://uhdspace.uhasselt.be/dspace/handle/1942/8342.*

Jans et al, Processing mining of events logs in internal auditing—a case study, European Accounting Association Slovenia, May 9-11, 2012 https://uhdspace.uhasselt.be/dspace/handle/1942/14227.*

Kuster et al, Generation of Business Process Mopdels for Object Life Cycle Compliance, LNCS, p. 165-181, BPM, Springer 2007 http://link.springer.com/chapter/10.1007%2F978-3-540-75183-0_13#p.-1.*

Liborio Carlos Miguel, Analysis and Discovery of Cervice Orchestrations, University Tecnica de Lisboa, Oct. 2010 https://dspace.ist.utl.pt/bitstream/2295/789286/1/Analysis%20And%20Discover%20Of%20Service%20Orchestrations%20-%20Carlos%20M.%20D.%20Liborio%202010%20(MScThesis).pdf.*

Medlin et al, A time-space network approach to corporate internationalization, Competitive paper, 28th Annual IMP Conf, Rome Italy Sep. 2012 https://www.researchgate.net/publication/259639108.*

Medlin John, Interactions in business relationships—a time perspective, Industrial Marketing Management v33, i3, pp. 185-193, Apr. 2004, North-Holland, Science Direct, Oct. 1, 2003 http://www.sciencedirect.com/science/article/pii/S0019850103001585.*

Nammakhunt et al, Process mining—Converting data from MS-Access Databse to MXML format, ISBN 978-1-4673-2316-1, Nov. 23 2012 http://ieeexplore.ieee.org/stamp/stamp.jsp?tp=&arnumber=6408557.*

Parks et al, Implementation of Process Networks in Java, Jul. 10, 1997 https://www.researchgate.net/profile/Edward_Lee13/publication/2742797_Implementation_of_Process_Networks_in_Java/links/5571cb6c08ae75215866fd59.pdf.*

PERT Chart and GANTT Chart, grantwritingbasics webpages, undated http://www.grantwritingbasics.com/grant-writing-formula/develop-your-idea/pert-chart-gantt-chart/.*

Petrusel et al, Making Decision Process Knowledge Explicit Using the Product Data Model, ISBN 978-90-386-2469-3, Eindhoven, Mar. 2011 http://cms.ieis.tue.nl/Beta/Files/WorkingPapers/wp_340.pdf.*

PJ van Heumen, Iterative Processing of Event Logs, Eindhoven University of Technology, Jul. 14, 2011 http://alexandria.tue.nl/extra1/afstversl/wsk-i/heumen2011.pdf.*

Rozinat et al, Conformance Cehcking of Processes Based on Monitoring Real Behavior, Journal Information Systems, V33, i1, Mar. 2008 http://citeseerx.ist.psu.edu/viewdoc/summary?doi=10.1.1.77.8293 http://dl.acm.org/citation.cfm?id=1316257.*

Ryndina et al, Consistency of Business Process Models and Object Life Cycles, LNCS p. 80-90, MoDELS 2006, Springer 2007 http://link.springer.com/chapter/10.1007%2F978-3-540-69489-2_11#p.1.*

Stuijk et al, Analyzing concurrency in streaming applications, Journal of Systems Architecture, V54, 11-2, pp. 124-144, Feb. 2008 http://www.sciencedirect.com/science/article/pii/S1383762107000926.*

Stuijk, CAST, a task-level concurrency analysis tool, IEEE, ISBN 0769518877, pp. 237-238, Jun. 20, 2003 http://ieeexplore.ieee.org/xpl/articleDetails.jsp?reload=true&arnumber=1207721.*

Stuijk, Sander, Concurrency in computational networks, in MEMCODE 2003, 1th International Conference on Formal Methods and Models for Co-Design, Proc 2002 http://citeseerx.ist.psu.edu/viewdoc/summary?doi=10.1.1.11.3714.* van der Aalst, Finding Structure and Unstructured Processes, The case for Process Mining, 0-7695-2902-x-07, ACSD 2007 IEEE, 2007 http://ieeexplore.ieee.org/stamp/stamp.jsp?tp=&arnumber=4276259.* van der Aalst, Workflow Patterns, Distributed and Parallel Databases, Kluwer Academic Publishers, 2003 http://link.springer.com/content/pdf/10.1023%2FA1022883727209.pdf http://clip.dia.fi.upm.es/Projects/S-CUBE/papers/aalst03:workflow_patterns.pdf.*

Viskic et al, Modeling kahn process networks on mpsoc platforms, Technical Report, Center for embedded computer systems, University of California Irvine, Jul. 11, 2008 https://www.researchgate.net/profile/Ines_Viskic/publication/229018656_Modeling_Kahn_Process_Networks_on_MPSoC_Platforms/links/00463517a8c5dc134f000000.pdf.*

Wahler et al, Predicting Coupling of Object-Centric Business Process Implementations, LNCS 5240, p. 148-163, BPM, Springer 2008 http://link.springer.com/content/pdf/10.1007%2F978-3-540-85758-7_13.pdf.*

Weaver et al, The real Gantt Charts were smarter than you think, mosaic project webpages archives org, Apr. 28, 2016 https://web.archive.org/web/20130515000000*/http://www.mosaicprojects.com.au/PDF_Papers/P158_Henry_Gantt_PPT.pdf.*

(56) References Cited

OTHER PUBLICATIONS

JavaBeans, Wikipedia, archives org, Feb. 18, 2013 https://web.archive.org/web/20130218052011/https://en.wikipedia.org/wiki/JavaBeans.*

S. Stuijk, J. Ypma, T. Basten; CAST—A Task-Level Concurrency Analysis Tool; Eindhoven University of Technology, PO Box 513, NL-5600 MB, Eindhoven, The Netherlands.

Tools and Techniques to Identify Concurrency Issues; MSDN Magazine, URL: http://msdn.microsoft.com/en-us/magazine/cc546569.aspx.

Y. Deng, P. Frankl, Z. Chen, Testing Database Transaction Concurrency, Automated Software Engineering, 2003. Proceedings. 18th IEEE International Conference http://ieeexplore.ieee.org/xpl/articleDetails.jsp?tp=&arnumber=1240306&contentType=Conference+Publications&quetyText%3DConcurrency+database°analysis+tools.

List of IBM Patents or Patent Applications Treated As Related.

Tony McCann et al., "Object Lifecycle Analysis Tool", U.S. Appl. No. 14/621,652, filed Feb. 13, 2015.

* cited by examiner

US 10,133,996 B2

OBJECT LIFECYCLE ANALYSIS TOOL

BACKGROUND

Many enterprises engage in commercial transactions. For instance, the financial industry frequently processes a high volume of payment transactions through multiple servers. Financial institutions, such as banks, handle numerous amounts of deposits, withdrawals, transfers, and the like on a daily basis. Because many of these transactions are time-sensitive, the transactions need to be processed efficiently.

To handle a high volume of transactions efficiently, servers process the transactions concurrently. Such processing may be executed using resources of each server. However, bottlenecks or non-concurrent pinch points may occur at different processing states for each transaction. These bottlenecks and pinch points hinder the ability of the servers to efficiently process the transactions.

Identifying where concurrency bottlenecks occur during processing may aid in preventing them from happening. One approach to do so is to examine and debug application code used to process the transactions. However, this approach presents several concerns. For example, the application code might be unavailable to an individual desiring to identify the bottlenecks. Further, even if the code is available, the individual might not have a thorough understanding of the application code.

SUMMARY

Embodiments presently disclosed herein provide a computer-implemented method. The method generally includes identifying one or more transaction objects having a specified identifier. Each of transaction objects corresponds to an instance of a common transaction having been processed. The method also includes retrieving transition state information corresponding to each transaction object. The method also includes sorting the transition state information for transaction object in chronological order. The method also includes generating a graph based on the sorted transition state information. The method generally includes identifying one or more transaction objects having a specified identifier. Each of transaction objects corresponds to an instance of a common transaction having been processed. The method also includes retrieving transition state information corresponding to each transaction object. The method also includes sorting the transition state information for transaction object in chronological order. The method also includes generating a graph based on the sorted transition state information.

Another embodiment of the invention includes a computer program product, the computer program product comprising a non-transitory computer-readable storage medium having computer-readable program code embodied therewith. The code, when executed on a processor, may generally be configured to perform an operation. The operation generally includes identifying one or more transaction objects having a specified identifier. Each of transaction objects corresponds to an instance of a common transaction having been processed. The operation also includes retrieving transition state information corresponding to each transaction object. The operation also includes sorting the transition state information for transaction object in chronological order. The operation also includes generating a graph based on the sorted transition state information. The operation generally includes identifying one or more transaction objects having a specified identifier. Each of transaction objects corresponds to an instance of a common transaction having been processed. The operation also includes retrieving transition state information corresponding to each transaction object. The operation also includes sorting the transition state information for transaction object in chronological order. The operation also includes generating a graph based on the sorted transition state information.

Still another embodiment of the invention includes a system having a processor and a memory containing an operation. The operation generally includes identifying one or more transaction objects having a specified identifier. Each of transaction objects corresponds to an instance of a common transaction having been processed. The operation also includes retrieving transition state information corresponding to each transaction object. The operation also includes sorting the transition state information for transaction object in chronological order. The operation also includes generating a graph based on the sorted transition state information. The operation generally includes identifying one or more transaction objects having a specified identifier. Each of transaction objects corresponds to an instance of a common transaction having been processed. The operation also includes retrieving transition state information corresponding to each transaction object. The operation also includes sorting the transition state information for transaction object in chronological order. The operation also includes generating a graph based on the sorted transition state information.

DETAILED DESCRIPTION

Embodiments presented herein provide techniques for generating a visualization of multiple transactions being processed concurrently in a system. The generated visualization may be used to analyze system performance of multithreaded processes throughout the system. For example, the visualization may be used to identify concurrency bottlenecks that occur while processing of the transactions.

In one embodiment, an analysis tool generates the visualizations. Applications that process transactions concurrently often store transition state information related to each individual transaction in transaction databases. In one embodiment, the analysis tool may be included with the transaction processing applications to use transaction data stored in such databases to generate the visualizations. The analysis tool retrieves information relevant to generating a visualization from transaction data stored in a transaction database. For example, such information may include transition state histories of each processed transaction. The transition state histories may include beginning and ending times of a particular transition state and a type of the transition state. The analysis tool organizes the data in chronological order. Once organized, the analysis tool generates a visual representation of lifecycles for each transaction based on the results from an initiation state to a completed state of a transaction.

The generated visualizations allow a system administrator (or other individual, such as a developer) to observe the efficiency and concurrency of a processing flow of multiple transactions. Through the graph, the individual may identify pinch points and bottlenecks in the overall transaction flow of the transaction. Such information allows the system administrator or developer to tune the transaction processing application to eliminate or reduce bottlenecks. Further, the system administrator may identify other performance issues, such as reduced throughput. Advantageously, graphs are generated using stored transaction data, analyses can be made without having to inspect application source code.

Note, the following description relies on a financial transaction management application as a reference example of an application having an analysis tool used to generate visualizations of object transition states. However, one of skill in the art will recognize that embodiments may be adapted for use in a variety of transaction-based contexts. For example, embodiments may be used by e-commerce-based services that process transactions concurrently and store transaction state data in a database. Generally, these techniques may be expanded to cover other transaction management systems and database sources.

Figure 1:
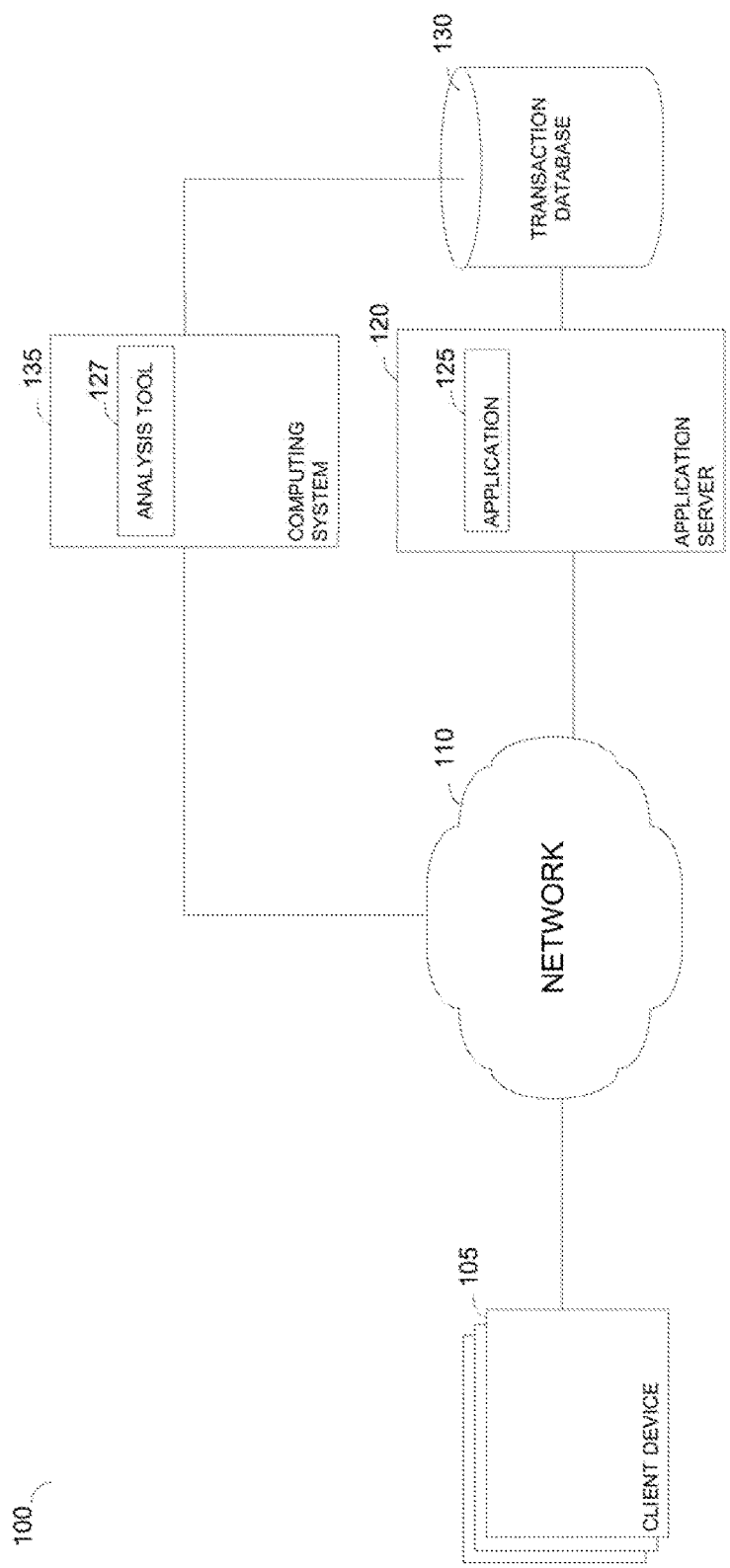
FIG. 1 illustrates an example computing environment, according to one embodiment.

FIG. 1 illustrates an example computing environment 100, according to one embodiment. As shown, the computing environment 100 includes multiple client devices 105 and an application server 120, each connected to a communications network 110. The application server 120 provides a multithreaded processing architecture for a financial transaction management application 125 that allows financial entities to integrate and optimize transactions with other financial entities. The financial transaction management application 125 processes, in parallel, a high volume of transaction objects. A transaction object is a set of operations that perform a task together. Examples of transaction objects in this context may be a deposit into an account, a transfer from one account to another, a payment transaction, etc., sent by the client devices 105. Note, although FIG. 1 depicts a single application server, multiple application servers may be deployed in the computing environment 100 to process the transactions sent by the client devices 105.

When the financial transaction management application 125 processes a transaction object, the transaction object enters various transition states. For instance, assume that a client device 105 initiates a payment transaction with the application server 120. An initial transition state of the payment transaction may be a "PAY_ORIG" state. An intermediary transition state may include a "GATEWAY_ACK" state. Another transition state may include a "PAYMENT_ACK" state. The transaction management application 125 may store the transition state data of each transaction object in a transaction database 130. In addition, the transaction management application 125 stores other information relevant to associating specific activity with a transaction object in the transaction database 130. For example, the transaction management application 125 may store mapper data in the database 130. Such data provides mappings of transmission types to transaction objects (e.g., payments, deposits, etc.). Other data stored in the transaction database 130 may include a type of transaction object, a type of transition state, a start time of the transaction state, an end time of the transaction state, duration, and the like.

In one embodiment, a computing system 135 hosts object lifecycle analysis tool 127. The analysis tool 127 generates graphs of test transaction data processed by the transaction management application 125. The graphs allow users (e.g., system administrators, developers, chief technology officers, etc.) to analyze performance issues in the application server 120 and the application 125. For example, such performance issues may include problems in concurrency (e.g., bottlenecks, pinch points, memory leaks, etc.). The graphs may display transaction objects that are created and transitions states for each of the transaction objects.

To generate an object lifecycle analysis graph, the user creates a set of test run data. The test run data is separate from actual production data and is used to provide a measure of performance of the transaction management application 125 sufficient to generate a performance graph. The test run data provides a set of transaction objects that include a distinct run tag that indicates that the set of transaction objects are test run data. Each set of test run data includes a distinct run tag to allow for fast retrieval from the transaction database. The user sends the test run data to the transaction management application 125. In turn, the transaction management application 125 receives the test run data as if the data were normal transaction data and processes the test run data. As the transaction management application 125 processes each test run object, data corresponding to each test run transaction object is stored in the transaction database 130 with the run tag. Thereafter, the analysis tool 127 may query the transaction database 130 to retrieve information about the test run data processed, such as state information, number of transactions processed per second, total transaction count, duration information, etc. The analysis tool 127 uses the retrieved information to generate a graph.

Figure 2:
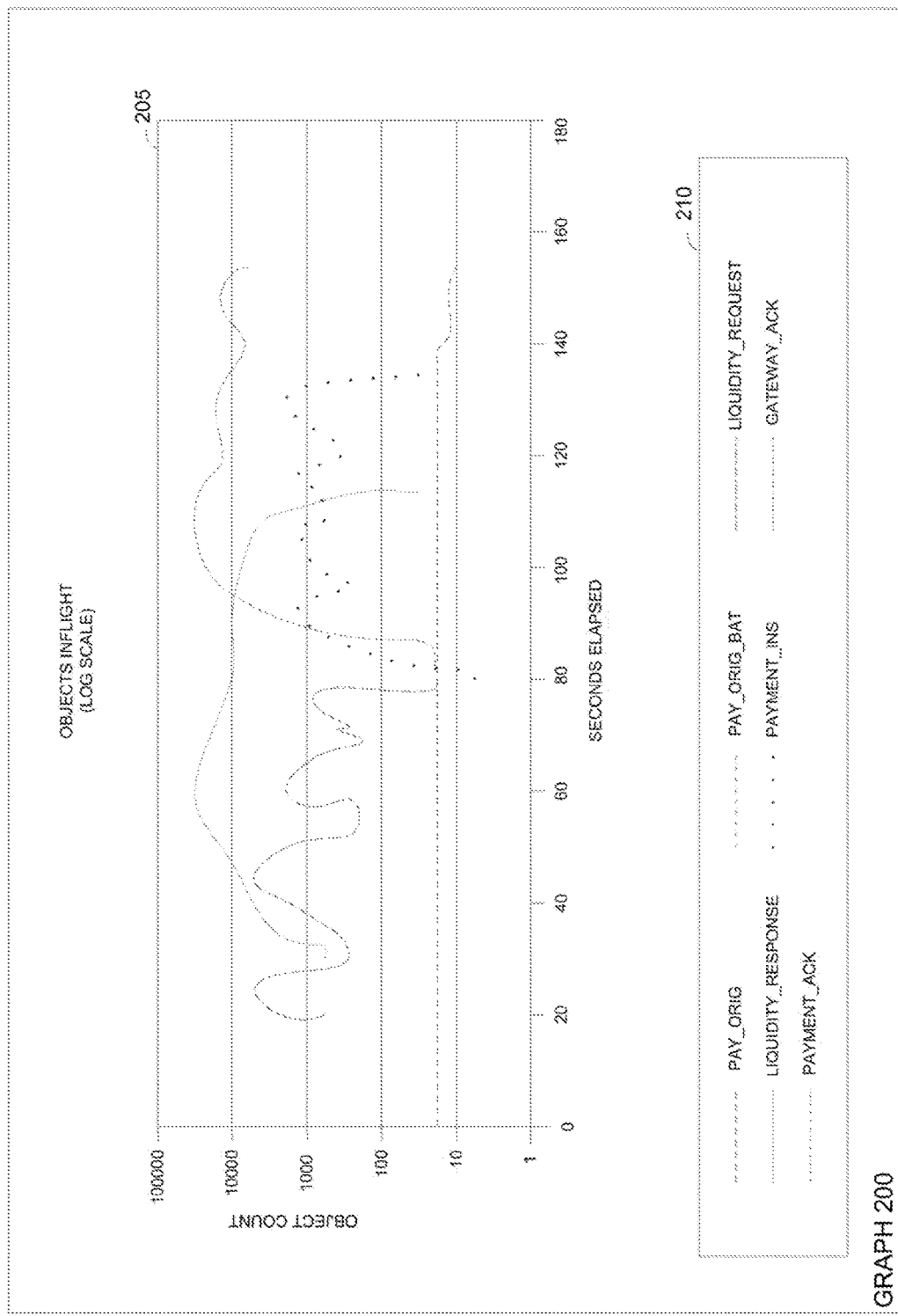
FIG. 2 illustrates an example transaction state graph, according to one embodiment.

FIG. 2 illustrates an example transaction state graph 200 generated by the analysis tool 127, according to one embodiment. The transaction state graph 200 displays a logarithmic scale of test run data objects in-flight in the system. More specifically, the transaction state graph 200 displays transition states over a period time with respect to an amount of test run transition state objects in graph 205. Using a logarithmic scale allows a user of the analysis tool 127 to view objects that have a small amount of instances as well as objects with a large amount of instances. Alternatively, the analysis tool 127 may display the transaction state graph 200 using a linear scale (not shown) to allow users to view objects that contain a large amount of instances.

Legend 210 lists transition states with corresponding lines. While the transaction management application 125 processes a transaction through the application server 120, the transaction enters various transition states. As shown, the transition states include "PAY_ORIG," "LIQUIDITY_RESPONSE," "PAYMENT_ACK," "PAY_ORIG_BAT," "PAYMENT_INS," "LIQUIDITY_REQUEST," and "GATEWAY_ACK." For example, when a payment transaction is initiated, the transaction may be in a "PAY_ORIG" state. Illustratively, the transaction state graph 200 depicts a scenario where the transition states are generally not being processed in a concurrent fashion. For instance, the "GATEWAY_ACK" transition states do not begin until the test run data is almost halfway processed.

The transaction state graph 200 displays data relevant to a user desiring to improve concurrency in the transactions being processed by the system. By observing the information displayed on the transaction state graph 200, the user may be able to tune the transaction management application 125 accordingly to reduce the influence of bottlenecks on throughput. For example, the user may identify problem areas in processing by observing when certain transaction states begin and end relative to other transaction states. As stated, the graph in FIG. 2 displays information that allows the user to observe that "GATEWAY_ACK" transition states do not begin until halfway through the test run. With this information, the user may identify concurrency bottlenecks and determine a cause for the bottlenecks in the underlying application or a solution for eliminating the bottlenecks.

Figure 3:
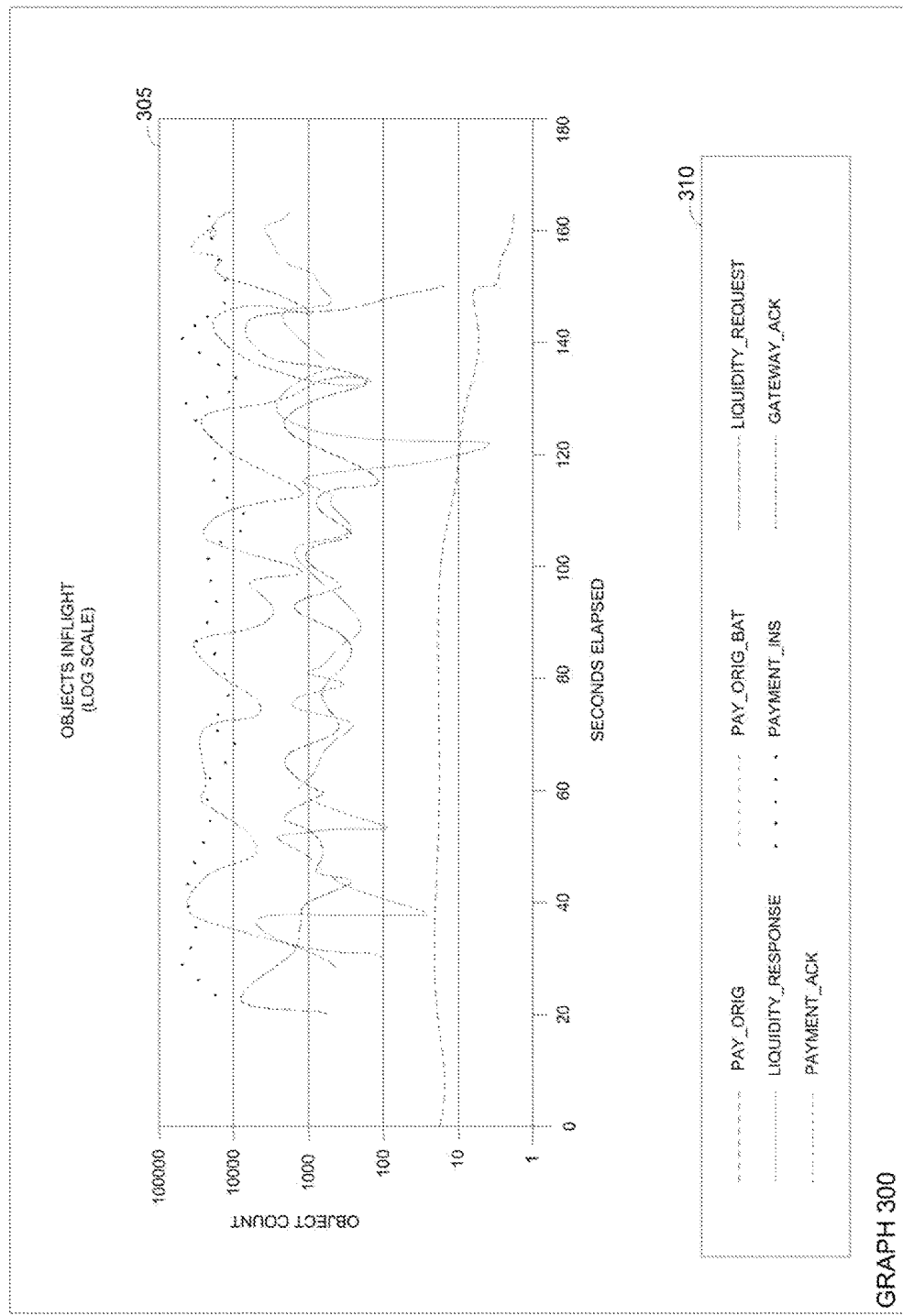
FIG. 3 illustrates an example transaction state graph, according to one embodiment.

FIG. 3 illustrates another example transaction state graph 300 generated by the analysis tool 127, according to one embodiment. Assume that the transaction state graph 300 was generated after the user tuned the transaction management application based on what was observed in the transaction state graph 200. Illustratively, as demonstrated by the distribution of the transition states over time, the transaction objects are being processed with more concurrency.

Figure 4:
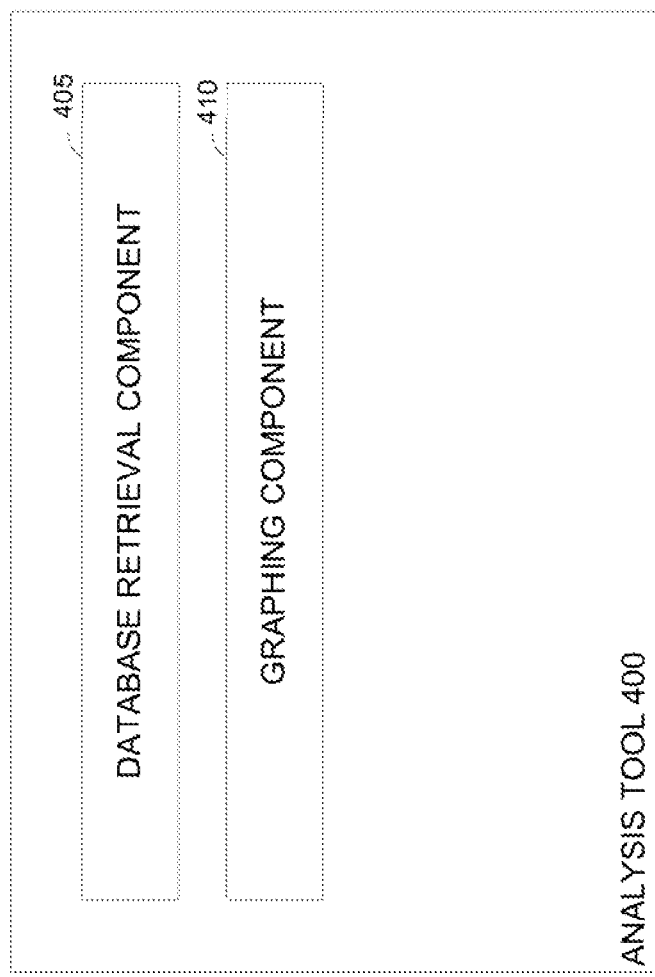
FIG. 4 illustrates an object lifecycle analysis tool, according to one embodiment.

FIG. 4 illustrates an object lifecycle analysis tool 400, according to one embodiment. As stated, the analysis tool generates a graph that displays a distribution of different transition states for transaction objects over time. As shown, the analysis tool includes a database retrieval component 405 and a graphing component 410.

The database retrieval component 405 is configured to query a transaction database for transition state information for transaction objects. Doing so allows the database retrieval component 405 to obtain information relevant in generating the analytical graph, such as temporal information for each transition state (e.g., beginning and end times, durations, etc.), type names of transition states, type names for transaction objects, and the like.

In one embodiment, data obtained by the database retrieval component 405 may include test run data generated and processed into the transaction database. To create test run data to store in the transaction database, a user (e.g., a system administrator) may generate a set of transaction objects that include an identifiable run tag. The user transmits the test run data to the transaction management application. In turn, the transaction management application processes the test run data as regular transaction data. As each transaction in the test run data is processed, the transaction management application 125 stores transition state information in the transaction database 130. The transition state information stored in the transaction database 130 includes the run tag used to distinguish the processed test run data from transaction data processed normally.

For example, the transition state information may include a beginning and ending times of each transition state, a duration of each state, a transaction count, transactions per second, and the like. Further, any transition state information related to the test data includes the run tag. Thus, when the database component 405 executes a query to retrieve data from the transaction database, the database component 405 obtains all transition state information relating to the test data associated with a given run tag.

The graphing component 410 generates the analytic graph. Once receiving the information from the database, the graphing component 410 organizes transition states associated with each transaction object into a chronological order.

In one embodiment, the graphing component 410 creates timeline database tables corresponding to the transaction states. The graphing component 410 reorganizes data obtained from the transaction database 130 chronologically and stores the organized data in the timeline tables. The graphing component 410 accumulates active transition states that had been processed in a given second with a given duration time (by subtype and status). The graphing component 410 stores the results in the timeline table corresponding to the object. After storing the results in the timeline tables, the graphing component 410 uses the timeline tables to create a graph for each table. The graphing component 410 generates the graphs. The graphing component 410 may output the graph to a spreadsheet that a user may later analyze. The spreadsheet may also contain state transition data derived from the transaction database. The visualized data allows a user to more quickly identify bottlenecks and other performance issues by displaying different transition states for each transaction processed for a given duration.

Figure 5:
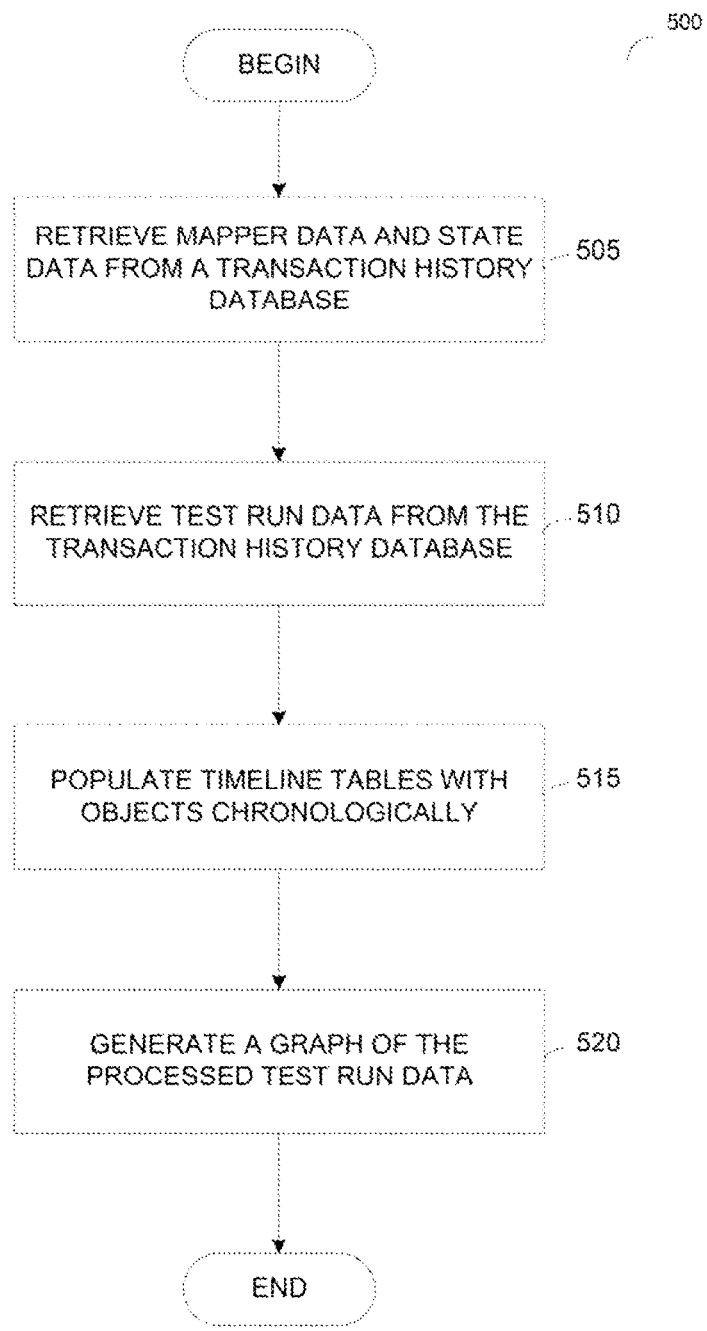
FIG. 5 illustrates a method diagram for generating a visualization of transition states of multiple objects, according to one embodiment.

FIG. 5 illustrates a method 500 for generating an analytic graph using the analysis tool, according to one embodiment.

As shown, the method 500 begins at step 505, where the analysis tool retrieves mapping data and state data from the transaction history database. As stated, the mapping data and the state data allow the analysis tool to associate activity with a corresponding transaction. More specifically, the mapping data provides mappings of transaction types to transaction objects processed by the financial management application. The state data provides information about transition state types. Further, the mapping data and the state data allow valid transmission types and object states to be represented in the graph.

At step 510, the analysis tool retrieves test run data from the transaction history database. For example, the analysis tool may retrieve transaction objects from the database identified using a given run tag. For each transaction, the analysis tool retrieves a total duration of the transaction, a subtype of the transaction, and state information of the transaction. Further, the analysis tool obtains a beginning time and an ending time for each state in the transaction. In addition, the analysis tool retrieves a total transaction count, a number of transactions per second metric, and a total duration of the test run process from the database. Once the test run data is gathered, the analysis tool may initialize a transaction object creation timeline table, a transaction object timeline table, and a transaction state timeline table. The analysis tool uses the timeline tables to store results of processing respective data.

At step 515, the analysis tool populates the timeline tables with the test run data gathered from the database based on the beginning times and ending time information. To do so, the analysis tool identifies transmission objects being processed for each second of the test run process and stores the results in the object creation timeline table. Further, the analysis tool identifies the transaction objects being processed for each second of the test run process and stores the results in the transaction object timeline table. The analysis tool processes the transaction states being processed for each second of the test run process and stores the results in the transaction state timeline table. The analysis tool processes the transaction states.

At step 520, after populating the timeline tables, the analysis tool generates a graph of the results stored in the timeline tables. The resulting graph displays a visualization of each transaction state for all transaction objects over the duration of the test run.

Figure 6:
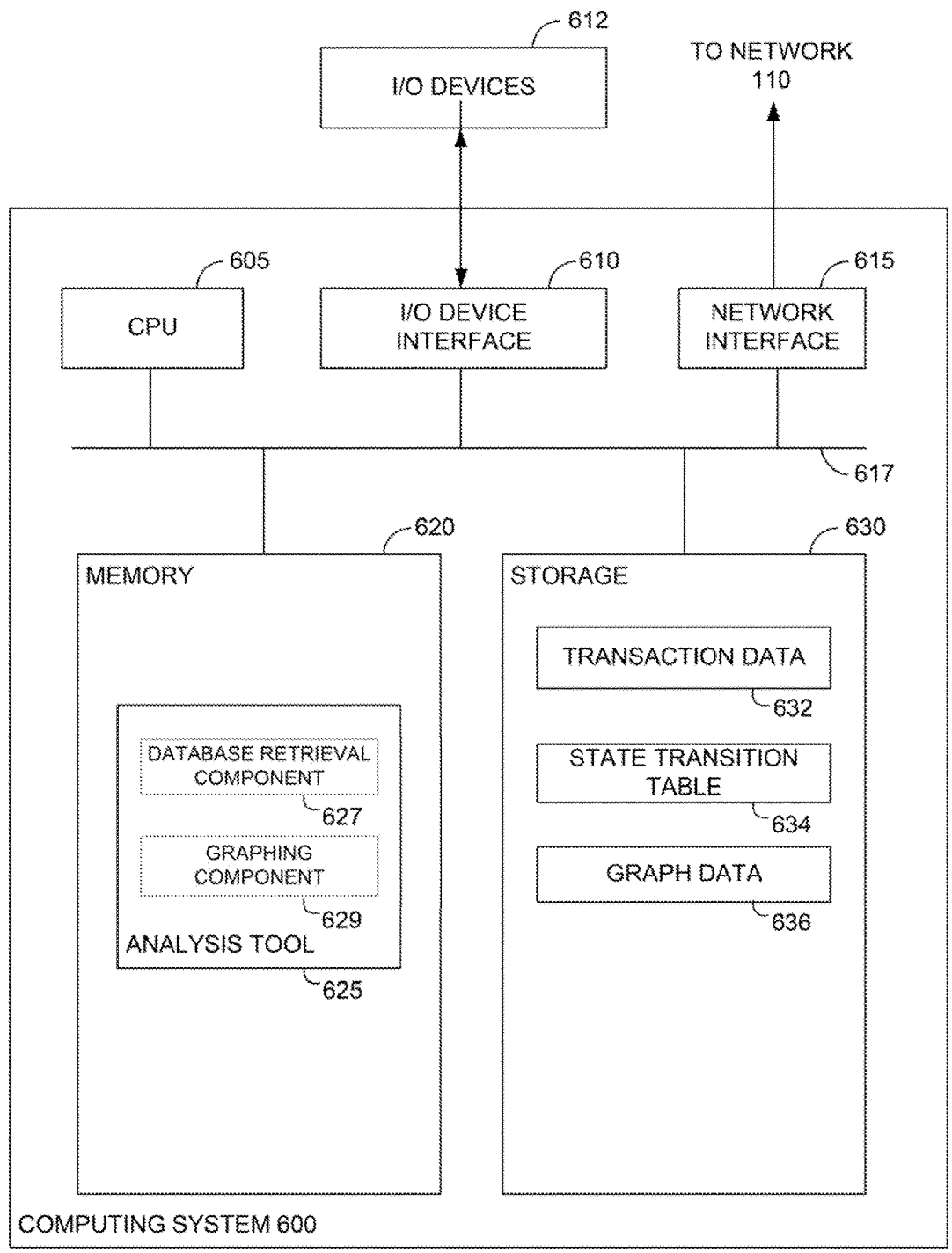
FIG. 6 illustrates a computer system configured with an application tool configured to generate a visualization of transition states of multiple objects, according to one embodiment.

FIG. 6 illustrates an example computing system 600, according to one embodiment. As shown, computing system 600 includes, without limitation, a multithreaded central processing unit (CPU) 605, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the storage 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an analysis tool 625. Storage 630 includes transaction data, a transaction table 634, and graph data 636. The analysis tool 625 processes the transaction data 632 obtained from a transaction database to generate an analytic graph to use in performance analysis. The analysis tool itself includes a database retrieval component 627 and a graphing component 629.

The database retrieval component 627 communicates with a transaction database to obtain information relevant to generating the analytic graph, such as transaction object types, subtypes, states, durations, etc. The graphing component 629 organizes the data chronologically into the state transition table 634. The graphing component 629 processes the state transition table 634 to generate the graph data 646 receives search queries and generates a culinary recipe based on the search query using text analytics.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the analysis tool could execute on a computing system in the cloud and generate analytical graphs based on transaction data obtained from a transaction database. In such a case, the analysis tool could store the generated graphs (e.g., in a spreadsheet format) and collected transition state information at a storage location in the cloud. Doing so allows a user to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for identifying concurrency bottlenecks occurring while processing lifecycle transactions from an initiation state to a completion state by visualizing said lifecycles transactions when processed concurrently, the computer program product comprising:
   a non-transitory computer-readable storage medium having computer-readable program code embodied therewith, wherein the code, when executed by a processor, performs an operation, the operation comprising:
      generating, for each of the lifecycle transactions, a plurality of transaction objects that include an identifiable run tag that distinguishes a set of test run data from other transaction data being normally processed;
      receiving, the set of test run data comprising the plurality of transaction objects, each of the transaction objects having a specified identifier indicating that each of the transaction objects is associated with the set of test run data and each of the respective transaction objects defined by a set of operations that together perform a task relating to each of the lifecycle transactions;
      sending, the set of test run data to an application;
      processing by the application the set of test run data;
      storing by the application in timeline tables of a transaction database, transition state information for each of the respective transaction objects, processed in each second for a duration of time by subtype and status of each of the lifecycle transactions corresponding to each of the transaction objects having been processed, wherein the transition state information corresponding to each of the transaction objects results from the application performing one or more of the operations in the set of operations associated with each of the transaction objects;
      generating, a database query that uses, at least in part, the specified identifier to retrieve the transition state information corresponding to all of the transaction objects associated with the set of test run data;
      executing, the database query against the transaction database to retrieve the transition state information corresponding to all of the transaction objects associated with the set of test run data from the transaction database;
      as each of the lifecycle transactions in the set of test run data is processed, storing, the transition state information in the transaction database including beginning and ending times of each transition state, a duration of each transition state, a transaction count, and transactions per second;
      organizing, the transition state associated with each of the transaction objects into a chronological order;
      reorganizing, the transition state information obtained from the transaction database chronologically and storing the reorganized transition state in the timeline tables;
      accumulating, active transition states that had been processed in each second for the duration of time by the subtype and the status of each of the lifecycle transactions;
      storing, results of the accumulated active transition states in a timeline table of the timeline tables corresponding to each transaction object;
      mappings, transaction types to the transaction objects as representations of a graph;
      retrieving, the mappings and transition state information from a history of each of the lifecycle transactions;
      retrieving, a total duration of each lifecycle transaction, a subtype of each lifecycle transaction, and the transition state information of each lifecycle transaction;
      obtaining, the beginning time and the ending time for each transition state in each lifecycle transaction;
      retrieving, from the transaction database, a total transaction count, a number of transactions per second, and a total duration of the set of test run data;
      initializing, after gathering the set of test run data, a transaction object creation timeline table, a transaction object timeline table, and a transaction state timeline table of the timeline tables;
      populating, the timeline tables with the set of test run data gathered from the transaction database based on the beginning time and the ending time to identify the transaction objects being processed for each second of the test run data and storing results of the processed transaction objects in the object creation timeline table;

identifying, the transaction objects being processed for each second of the test run data and storing the results in the transaction object timeline table;

processing, the transaction states being processed for each second of the test run data and storing results of the processed transaction states in the transaction state timeline table;

generating, after processing the transaction states, the graph of the transition state information for each transaction object in a logarithmic scale based on the reorganized transition state information and the timeline tables; and outputting, the graph into a spreadsheet to identify the concurrency bottlenecks occurring while processing the lifecycle transactions from the initiation state to the completion state.

2. The computer program product of claim 1, wherein each transaction object corresponds to another instance of a transaction of the lifecycle transactions.

3. The computer program product of claim 1, wherein the duration of time is equal to one second.

4. A system comprising:
a processor; and
a memory storing a program which, when executed on the processor, performs an operation for identifying concurrency bottlenecks occurring while processing lifecycle transactions from an initiation state to a completion state by visualizing said lifecycles transactions when processed concurrently, the operation comprising:

generating, for each of the lifecycle transactions, a plurality of transaction objects that include an identifiable run tag that distinguishes a set of test run data from other transaction data being normally processed;

receiving, the set of test run data comprising the plurality of transaction objects, each of the transaction objects having a specified identifier indicating that each of the transaction objects is associated with the set of test run data and each of the respective transaction objects defined by a set of operations that together perform a task relating to each of the lifecycle transactions;

sending, the set of test run data to an application;

processing by the application the set of test run data;

storing by the application in timeline tables of a transaction database, transition state information for each of the respective transaction objects, processed in each second for a duration of time by subtype and status of each of the lifecycle transactions corresponding to each of the transaction objects having been processed, wherein the transition state information corresponding to each of the transaction objects results from the application performing one or more of the operations in the set of operations associated with each of the transaction objects;

generating, a database query that uses, at least in part, the specified identifier to retrieve the transition state information corresponding to all of the transaction objects associated with the set of test run data;

executing, the database query against the transaction database to retrieve the transition state information corresponding to all of the transaction objects associated with the set of test run data from the transaction database;

as each of the lifecycle transactions in the set of test run data is processed, storing, the transition state information in the transaction database including beginning and ending times of each transition state, a duration of each transition state, a transaction count, and transactions per second;

organizing, the transition state associated with each of the transaction objects into a chronological order;

reorganizing, the transition state information obtained from the transaction database chronologically and storing the reorganized transition state in the timeline tables;

accumulating, active transition states that had been processed in each second for the duration of time by the subtype and the status of each of the lifecycle transactions;

storing, results of the accumulated active transition states in a timeline table of the timeline tables corresponding to each transaction object;

mappings, transaction types to the transaction objects as representations of a graph;

retrieving, the mappings and transition state information from a history of each of the lifecycle transactions;

retrieving, a total duration of each lifecycle transaction, a subtype of each lifecycle transaction, and the transition state information of each lifecycle transaction;

obtaining, the beginning time and the ending time for each transition state in each lifecycle transaction;

retrieving, from the transaction database, a total transaction count, a number of transactions per second, and a total duration of the set of test run data;

initializing, after gathering the set of test run data, a transaction object creation timeline table, a transaction object timeline table, and a transaction state timeline table of the timeline tables;

populating, the timeline tables with the set of test run data gathered from the transaction database based on the beginning time and the ending time to identify the transaction objects being processed for each second of the test run data and storing results of the processed transaction objects in the object creation timeline table;

identifying, the transaction objects being processed for each second of the test run data and storing the results in the transaction object timeline table;

processing, the transaction states being processed for each second of the test run data and storing results of the processed transaction states in the transaction state timeline table;

generating, after processing the transaction states, the graph of the transition state information for each transaction object in a logarithmic scale based on the reorganized transition state information and the timeline tables; and outputting, the graph into a spreadsheet to identify the concurrency bottlenecks occurring while processing the lifecycle transactions from the initiation state to the completion state.

5. The system of claim 4, wherein each transaction object corresponds to another instance of a transaction of the lifecycle transactions.

6. The system of claim 4, wherein the duration of time is equal to one second.

\* \* \* \* \*